(12) United States Patent
Jacobs et al.

(10) Patent No.: US 10,379,572 B2
(45) Date of Patent: *Aug. 13, 2019

(54) MOBILE DEVICE CASE WITH SHADE

(71) Applicants: Leslie Suzanne Jacobs, Corte Madera, CA (US); Jonathan Bradley Jacobs, Corte Madera, CA (US)

(72) Inventors: Leslie Suzanne Jacobs, Corte Madera, CA (US); Jonathan Bradley Jacobs, Corte Madera, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 15/660,913

(22) Filed: Jul. 26, 2017

(65) Prior Publication Data

US 2017/0322590 A1 Nov. 9, 2017

Related U.S. Application Data

(63) Continuation-in-part of application No. 14/999,452, filed on May 10, 2016, now Pat. No. 9,806,756.

(60) Provisional application No. 62/284,660, filed on Oct. 6, 2015.

(51) Int. Cl.
| *H04M 1/02* | (2006.01) |
| *G06F 1/16* | (2006.01) |
| *A45F 5/00* | (2006.01) |
| *H04B 1/3888* | (2015.01) |
| *A45C 11/00* | (2006.01) |

(52) U.S. Cl.
CPC .............. *G06F 1/1603* (2013.01); *A45F 5/00* (2013.01); *G06F 1/1626* (2013.01); *G06F 1/1628* (2013.01); *H04B 1/3888* (2013.01); *H04M 1/0202* (2013.01); *H04M 1/026* (2013.01); *A45C 2011/003* (2013.01); *A45C 2200/15* (2013.01)

(58) Field of Classification Search
CPC .............................. G06F 1/1603; G06F 1/1628
See application file for complete search history.

(56) References Cited

U.S. PATENT DOCUMENTS

| 9,596,332 | B2 | 3/2017 | Gander et al. | |
| 2013/0075543 | A1* | 3/2013 | Krohn | G06F 1/1632 248/121 |
| 2014/0150837 | A1* | 6/2014 | Darquea | E04H 15/003 135/96 |
| 2014/0375901 | A1* | 12/2014 | Stockett | H04N 5/64 348/838 |
| 2015/0381785 | A1 | 12/2015 | Gander et al. | |

FOREIGN PATENT DOCUMENTS

| CN | 202488530 U | 10/2012 |
| CN | 203106077 U | 8/2013 |
| CN | 103565066 A | 2/2014 |

* cited by examiner

*Primary Examiner* — Tuan H Nguyen
(74) *Attorney, Agent, or Firm* — Steven A. Nielsen; www.NielsenPatents.com

(57) ABSTRACT

A mobile device case with shade includes an open-topped case that can removeably retain a mobile device, a shade that includes a plurality of panels each having connected to each other by means of integral mating hinges, with at least one of the panels also being connected by means of at least one hinge to the mobile device case, wherein the shade is capable of being set in a deployed position to shade the display screen of the mobile device.

9 Claims, 35 Drawing Sheets

MOBILE DEVICE CASE WITH SHADE

CROSS REFERENCE TO RELATED APPLICATIONS

This application is a continuation-in-part of U.S. patent application Ser. No. 14/999,452, filed on May 10, 2016.

U.S. patent application Ser. No. 14/999,452 claims benefit of U.S. provisional patent application Ser. No. 62/284,660, filed on Oct. 6, 2015, both of which applications are incorporated herein in their entireties by this reference thereto.

BACKGROUND

Technical Field

This disclosure relates generally to the field of mobile device accessories and more specifically to a mobile device case with shade.

Background Discussion

Mobile devices having digital display screens are very common and are used by many people around the world today. When a smart phone is used in a brightly lit environment, such as outdoors on a sunny day, it can be difficult to see the contents of the screen without shading the display, usually with one's hand. However, it is difficult to shade the display with one hand and simultaneously operate the phone, for example, when typing information into the phone.

While there exist shade devices for mobile devices, they have several deficiencies. Many conventional designs create a shade effect on the top of the device, but do not address the issue of shading the side portions. These designs are helpful only if the bright light source is coming from directly above. If the bright light source comes from the left or right side of the device, the shade is not effective. Additionally, none of the designs stay in place easily, requiring the user to use one hand to hold the shade in place. Some designs have the shade residing directly on top of the device display which makes it difficult for a user to access and use the touch screen display of the device.

SUMMARY

A mobile device case with shade includes an open-topped case that can removeably retain a mobile device, a shade that includes a plurality of panels each having connected to each other by means of integral mating hinges, with at least one of the panels also being connected by means of at least one hinge to the mobile device case, wherein the shade is capable of being set in a deployed position to shade the display screen of the mobile device.

DETAILED DESCRIPTION

Detailed descriptions of embodiments of a mobile device case with shade are provided herein. It is to be understood, however, that the present device may be embodied in various forms. Therefore, specific details disclosed herein are not to be interpreted as limiting, but rather as a basis for the claims and as a representative basis for teaching one skilled in the art to employ the present device in virtually any appropriately detailed system, structure or manner.

Many people protect their mobile devices in cases that closely conform to the sides and back of the phone. It would be helpful to integrate a shade device into a phone case that can be deployed in bright light conditions. It will be appreciated that, throughout the present Description, the term "mobile device" is broadly meant to refer to a portable computing device. Thus, within the present context, the expression "mobile device can encompass presently-known mobile devices such as smartphones, tablets, laptop computers and notebook computers. Additionally, wearable or body-borne devices such as wrist-borne devices also may be considered to be mobile devices within the present context. Additionally, within the present context, a mobile device can constitute a device for playing sound files such as an IPOD (APPLE, Inc., Cupertino, Calif.). Furthermore, a "mobile device" can refer to certain conventional hard-copy materials such as books or magazines.

Figure 1:
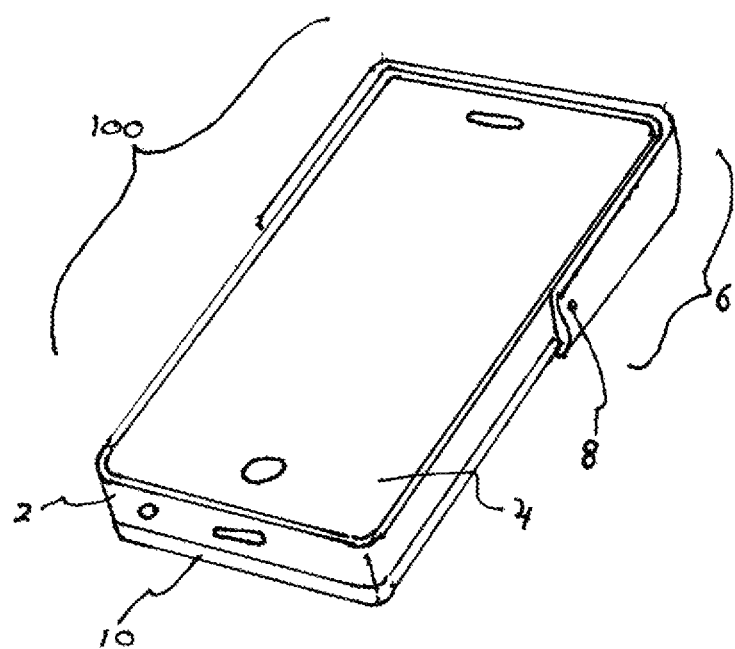
FIG. 1 is a perspective view of a mobile device case with shade in stored position.

Referring now to FIG. 1 we see a perspective view of a smartphone case 100 with the shade portion 6 in the stored position. A standard smartphone 4 is housed in an open-topped case 2. The shade portion 6 is rotatably pinned to the case at shaft 8.

Figure 2:
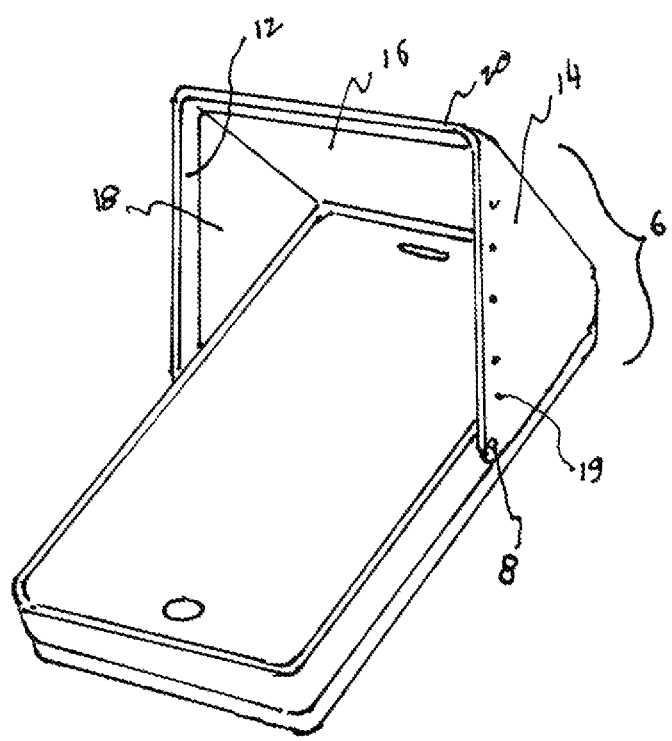
FIG. 2 is a perspective view of a mobile device case with the shade in the deployed position

FIG. 2 shows the present device 100 with the shade 6 in the deployed position. The shade is made up of a flexible and retractable center sheet member 16 and two flexible side wall members 14, 18. The center sheet 16 is connected to U-shaped frame 12 at leading edge 20. The frame legs pivot about hinge post 8.

Figure 3:
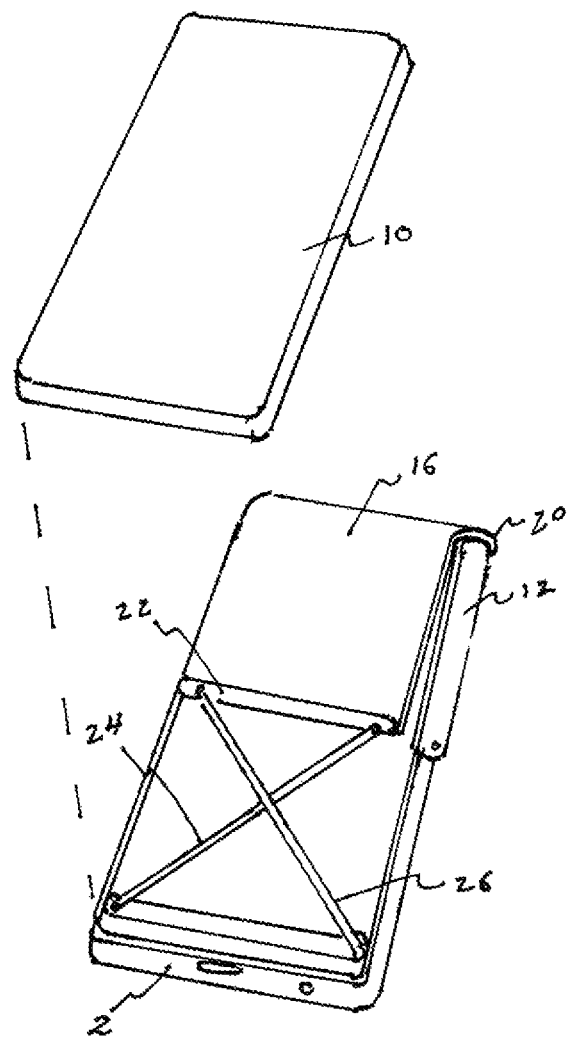
FIG. 3 is an exploded view of the shade mechanism in the stored position.

FIG. 3 is an exploded rear view showing rear cover plate 10 removed from the bottom of the open-topped case 2 and exposing the elastic cords 24, 26 that are attached to the trailing edge 22 of the center sheet 16. This shows the sheet 16 in the stored and non-extended position which is hidden inside cover 2.

Figure 4:
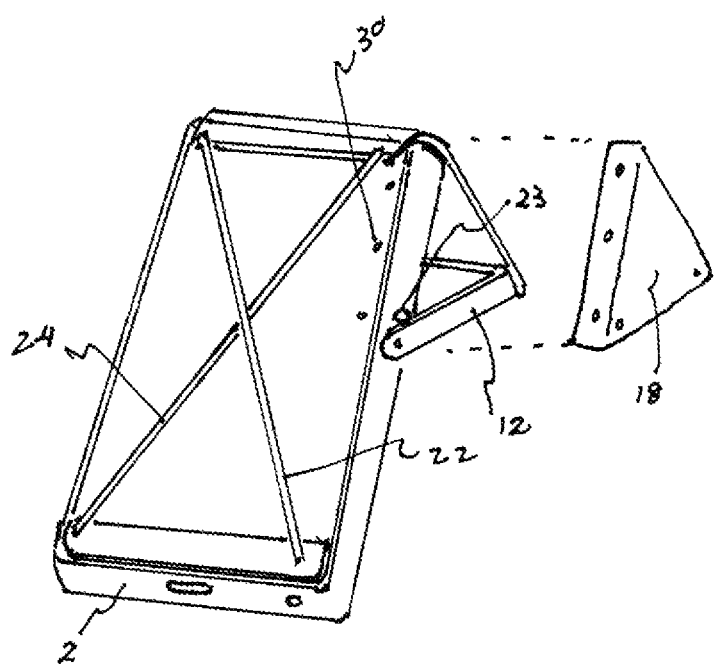
FIG. 4 is an exploded view of the shade mechanism in the deployed position.

FIG. 4 is a rear perspective view of the elastic cords 22, 24 in their extended position as sheet 16 is pulled out and used as a shade. Side shade 18 is attached to the frame 12 and to the underside of the phone holding case 2 via rivets or other standard attachment means.

Figure 5:
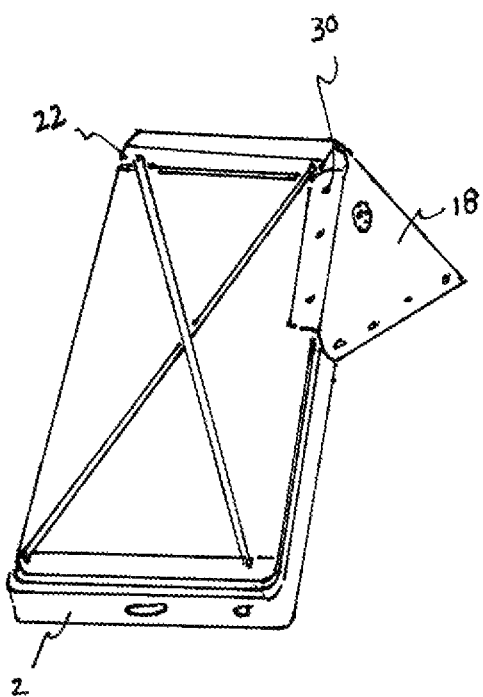
FIG. 5 is a perspective view of the rear of the mobile device case with protective cover removed.

FIG. 5 shows the side shade 18 installed on frame 12 and phone case 2. A similar shade is attached on the opposite side, not shown, in the same way.

Figure 6:
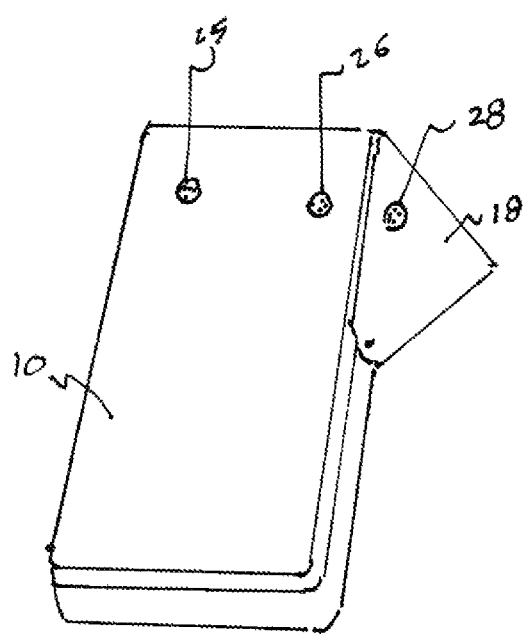
FIG. 6 is a perspective view of the rear of the mobile device case with shade deployed.
Figure 7:
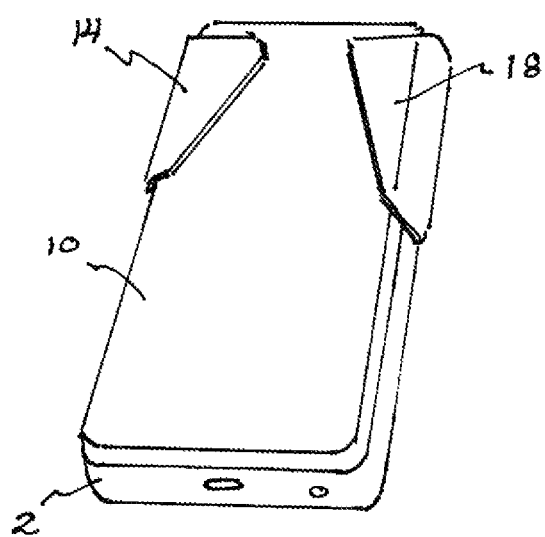
FIG. 7 is a perspective view of the rear of the mobile device case with shade in storage position.

FIG. 6 shows the underside of the invention 100 with the cover plate 10 in place. VELCRO (VELCRO COMPANIES, Manchester, N.H.) loop member 28 is fixed to the shade and can engage VELCRO hook member 26 when the shade 6 is in the stored position as shown in FIG. 7.

Figure 8:
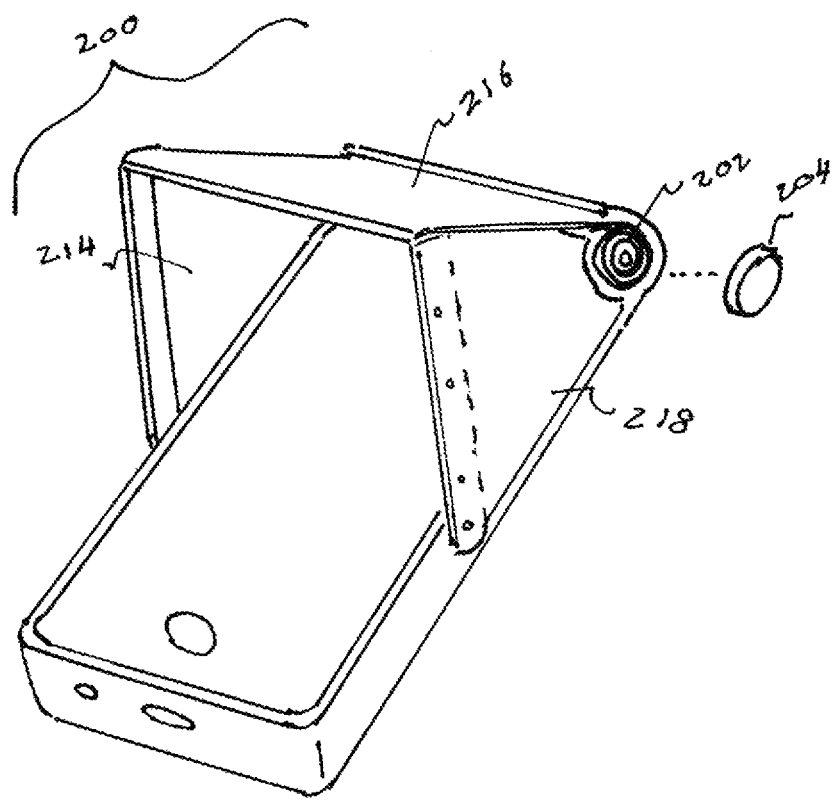
FIG. 8 is a perspective view of a mobile device case with shade showing a roll up shade deployed.

FIG. 8 shows an embodiment 200 where sheet 216 can be rolled into a case 202 for storage. The sheet attached to a spring biased shaft that allows the sheet 216 to be automatically pulled into the case 202 for storage. The side sheets 218 operate in a similar fashion to the first embodiment 100.

Figure 9:
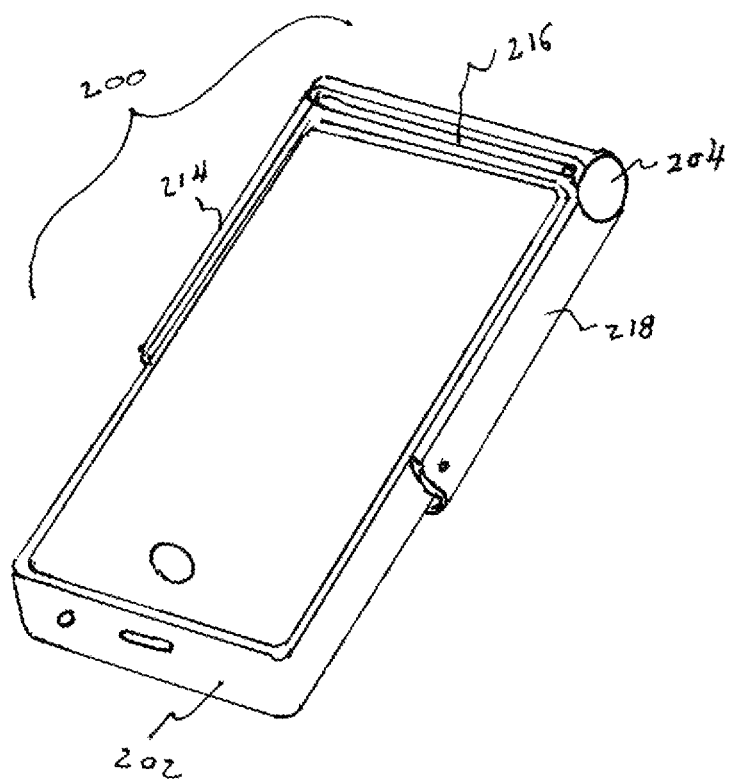
FIG. 9 is a perspective view of a mobile device case with shade with roll up shade in storage position.

FIG. 9 shows the embodiment 200 with the shade in the stored position.

Figure 10:
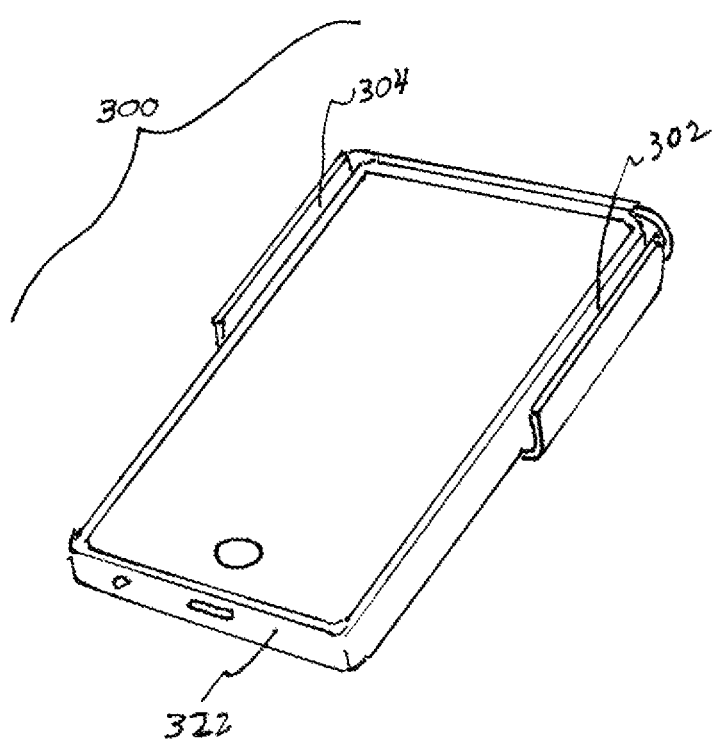
FIG. 10 is a perspective view of a mobile device case with shade having shade members with living hinges in a stored position.
Figure 11:
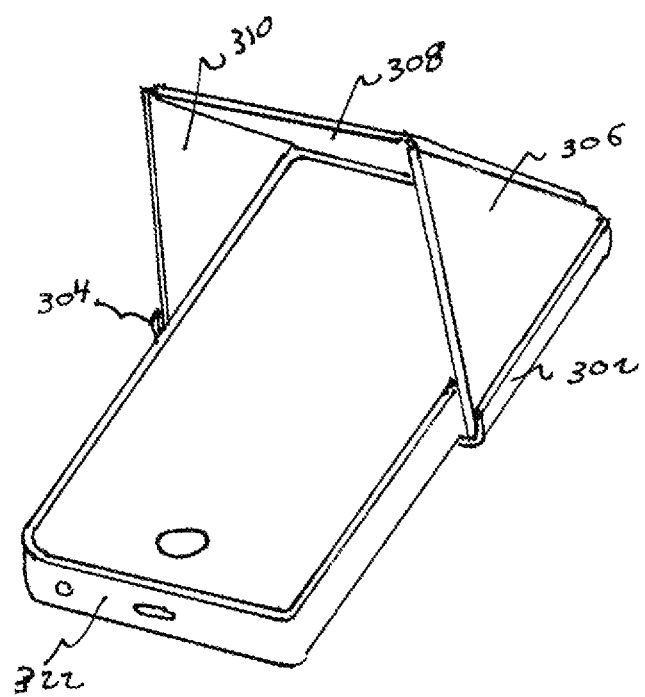
FIG. 11 is a perspective view of a mobile device case with shade t in the deployed position.
Figure 12:
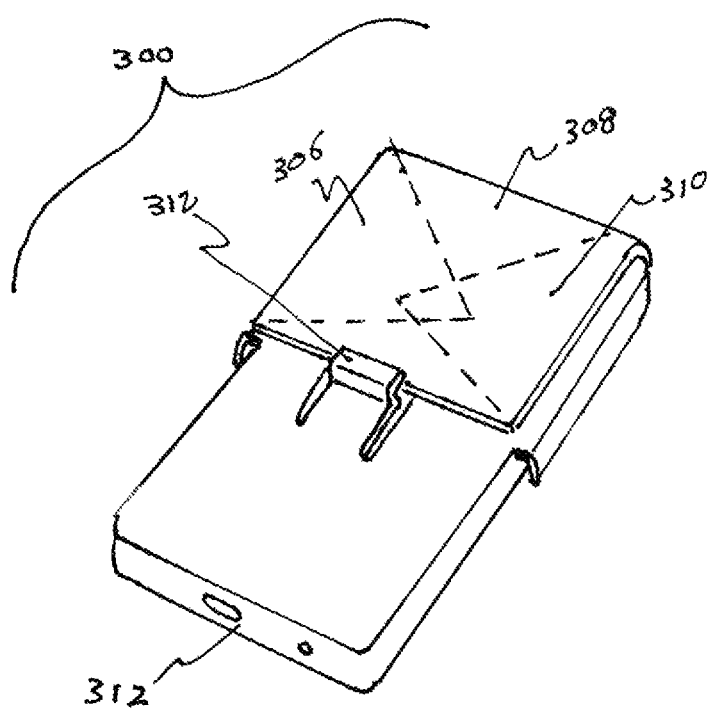
FIG. 12 is a rear view of a mobile device case with shade in the stored position.

FIG. 10 is a perspective view of a third embodiment 300 where track members 302, 304 hold side shades 306, 310 in place as shown in FIG. 11. The center sheet 308 attaches to side shades 306, 310 by living hinges molded into the polypropylene formed center 308 and side sheets 306, 310. The center sheet 308 can fold back to be parallel with the back of the phone case 322 as shown in FIG. 12, and side sheets 306, 310 are stored under the center sheet 1210 as shown by dotted lines. Resilient L-shaped retaining member 312 holds the shade assembly in place for storage. To use, a person pulls back on the L-shaped retainer and releases the shade for deployment.

Figure 13:
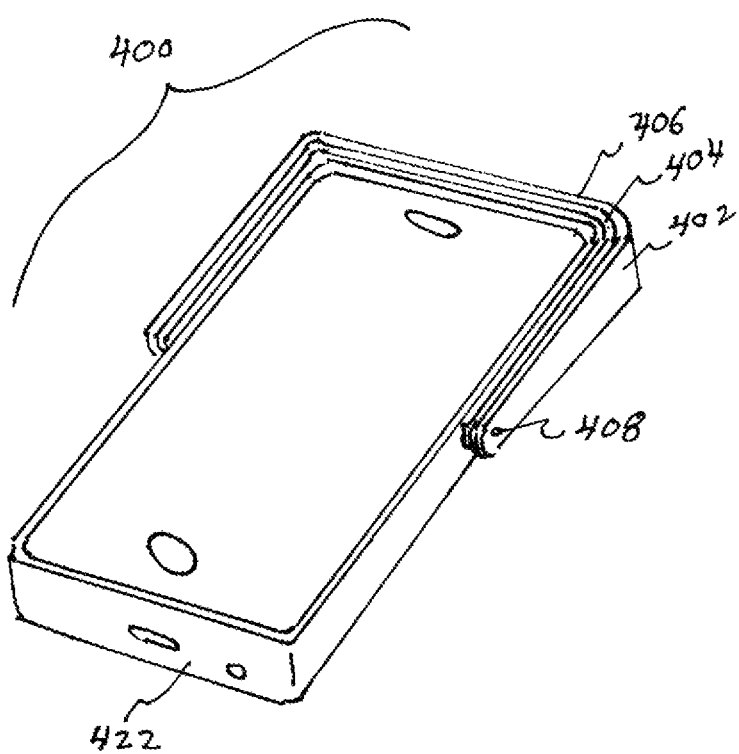
FIG. 13 is a front perspective view of a mobile device case with shade in the stored position.

FIG. 13 shows an embodiment 400 where a plurality of U shaped members 402, 404, 406 is pinned 408 to the side wall of the phone case 422.

Figure 14:
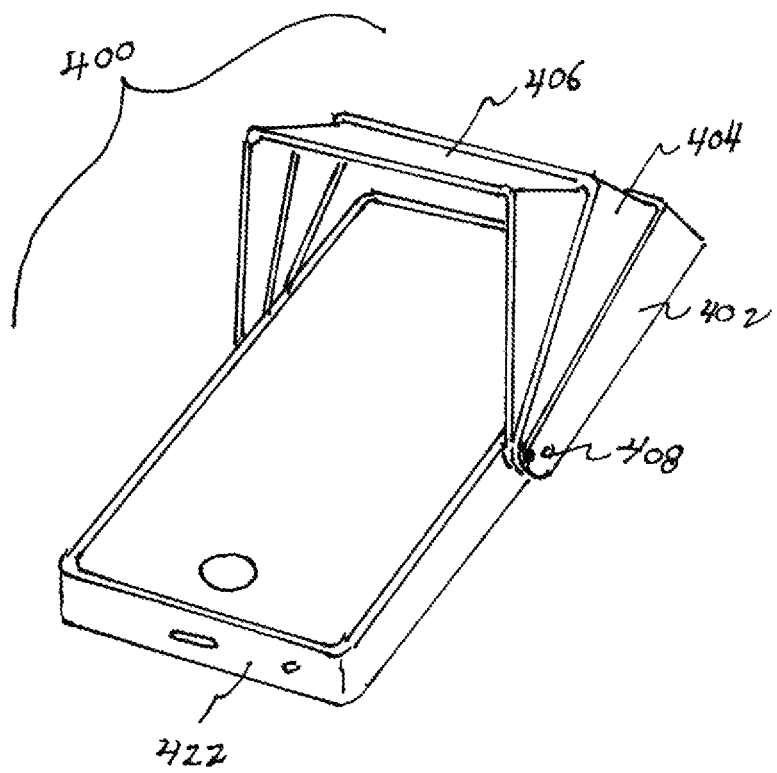
FIG. 14 is a front perspective view of a mobile device case with shade in the deployed position.

FIG. 14 shows an embodiment 400 in the deployed position where U-shaped members 402, 404, 406 are rotated up and form a shade.

Figure 15:
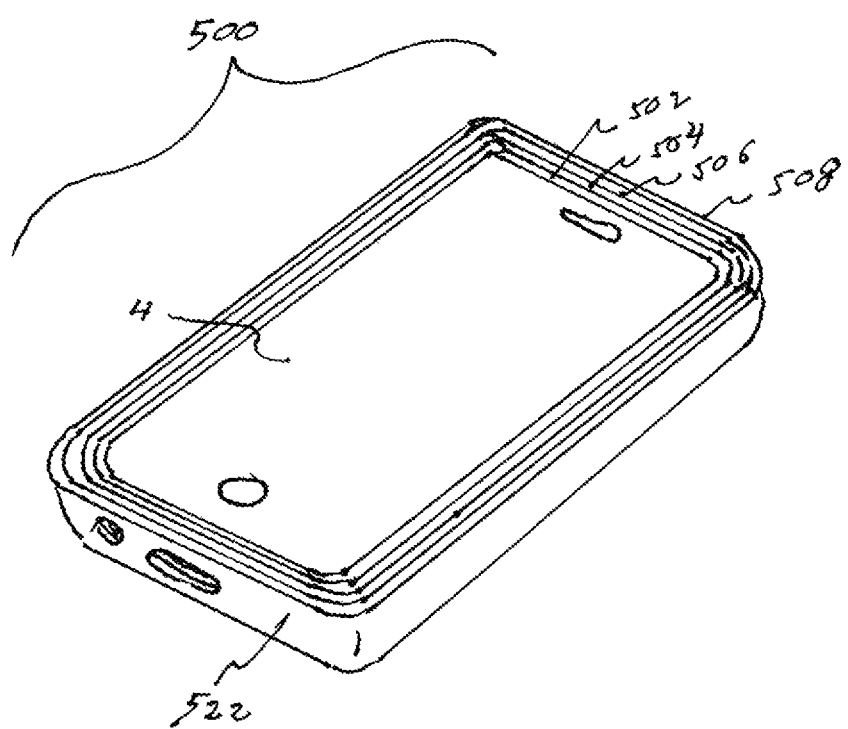
FIG. 15 is a perspective view of an embodiment of a mobile device case with shade in the stored position.
Figure 16:
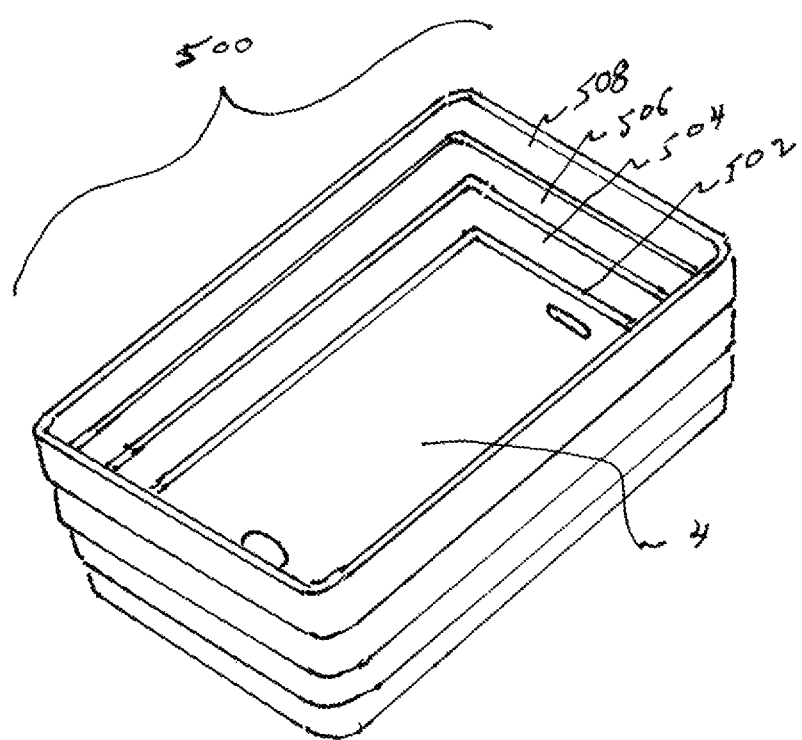
FIG. 16 is a perspective view of an embodiment of a mobile device case with shade in the deployed position.

FIG. 15 is a perspective view of an embodiment 500 in the stored position. A plurality of frame members 502, 504, 506, 508 surround the phone 4 and can be lifted to form surrounding walls, as shown in FIG. 16 to shade the phone 4 from bright light.

Figure 17:
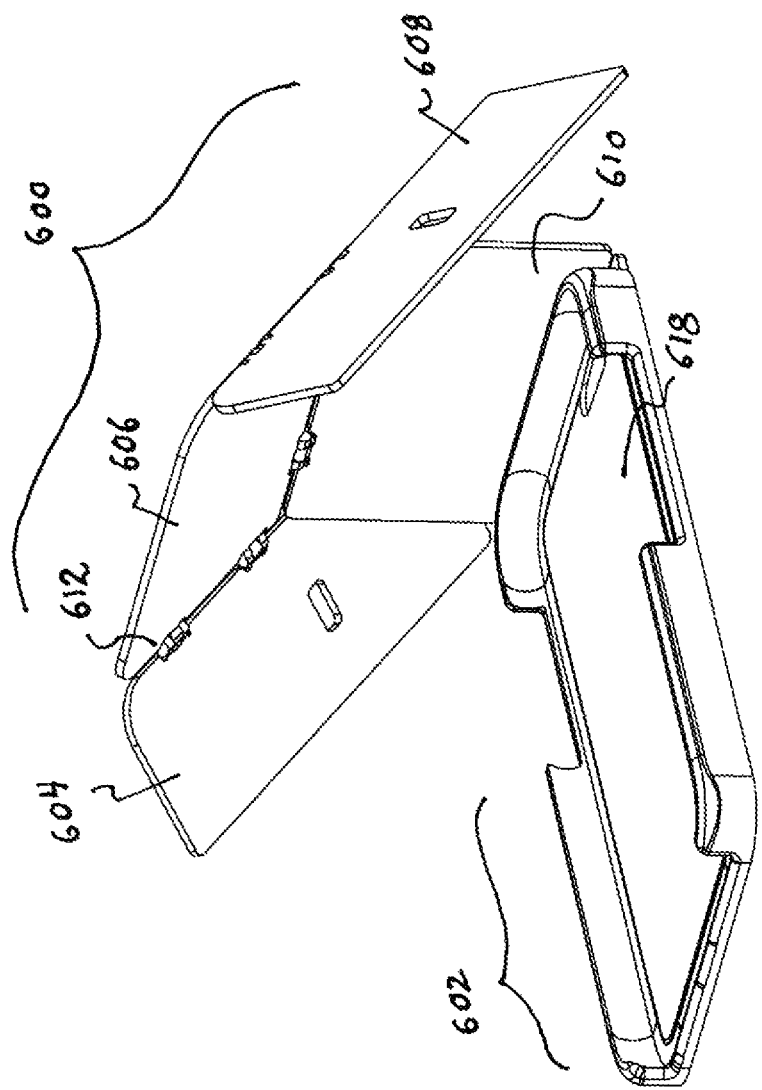
FIG. 17 is a perspective view of an embodiment of a mobile device case with shade in the deployed position.

FIG. 17 is a perspective view of a further embodiment 600. A series of hinged 612 panels 604, 606, 608, 610 can fold to be placed in a position that shades the screen of a phone stored in phone case 602. The hinges 612 are all identical and are designed to be a very tight fit that causes a fiction based holding effect where the panels remain wherever the user sets them, thereby providing infinite adjustability. Optionally, an additional panel can be hingedly joined to the front edge of panel 606 giving greater shading ability. Also, optionally, a hinged easel type kickstand member can be attached to the back side of phone case 602 panel 618 to allow the case to be propped up during use. In embodiments, the panels may be injection molded from a polymer such as nylon or polycarbonate which has a natural spring quality and will not take a cold set when the hinge parts are forced together for extended periods of time.

Figure 18:
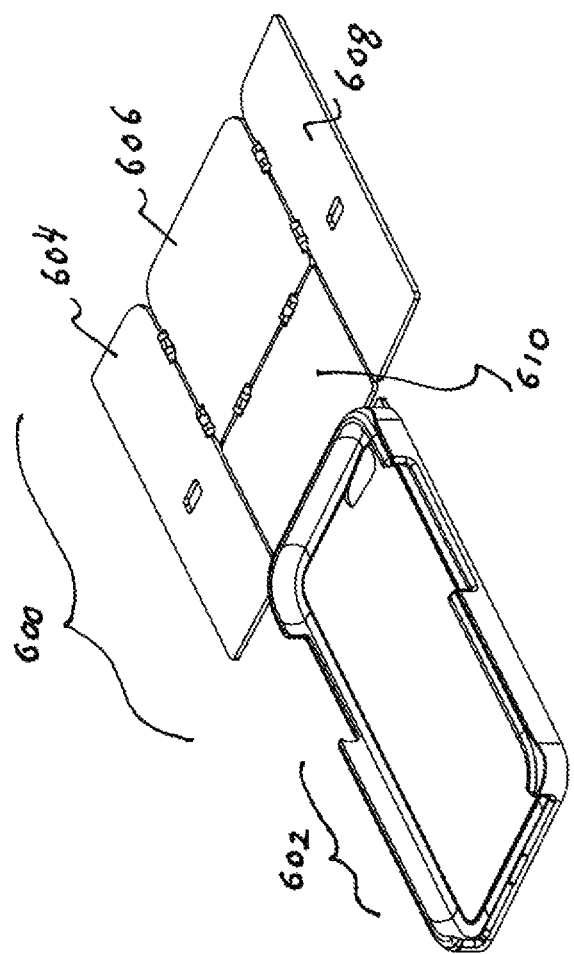
FIG. 18 is a perspective view of an embodiment of a mobile device case with shade in the flattened position.

FIG. 18 is a perspective view of an embodiment 600 with the panels 604, 606, 608, 610 laid out in a flat position before being folded into the desired shade making position shown in FIG. 17.

Figure 19:
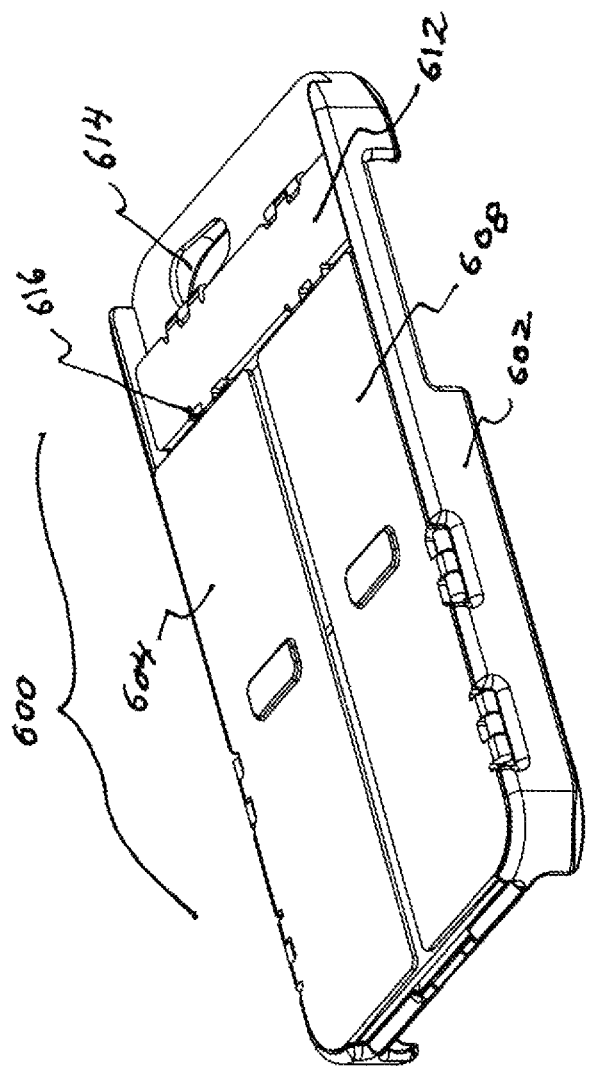
FIG. 19 is a perspective view of an embodiment of a mobile device case with shade in the stored position.

FIG. 19 is a rear perspective view of the embodiment 600 showing the panels 604, 606, 608, 610 in the folded and stored position. This view also shows panel 612 which allows the shade 600 to be clear of the camera aperture 614 and yet still fold at joint 616 to allow the shade 600 to rotate up and over the phone case 602. This position shows that, at first glance, the case 600 resembles many other protective phone cases, however it magically allows a user to quickly and easily deploy a sun shade when needed. It is to be appreciated that the embodiments of FIGS. 1-19, although they have been described in reference to smartphones, are readily adapted to other mobile devices such as tablets, laptops, notebooks and wearables, in most cases, with nothing more than modifications in their dimensions, which render them readily usable with other mobile devices besides smartphones.

Figure 20:
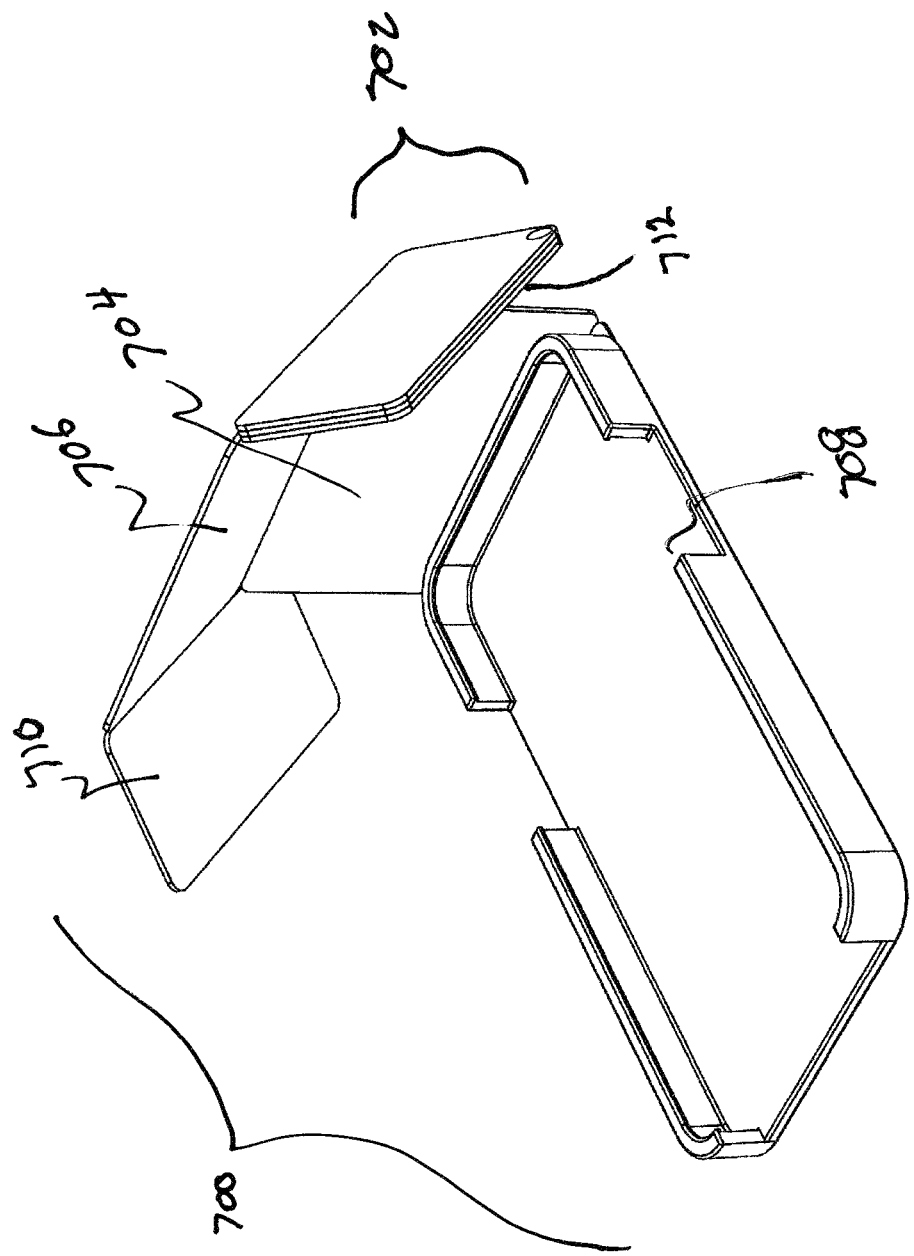
FIG. 20 is a perspective view of a further embodiment wherein additional hinged panels act to shade the device screen when the screen is in a horizontal orientation.
Figure 21:
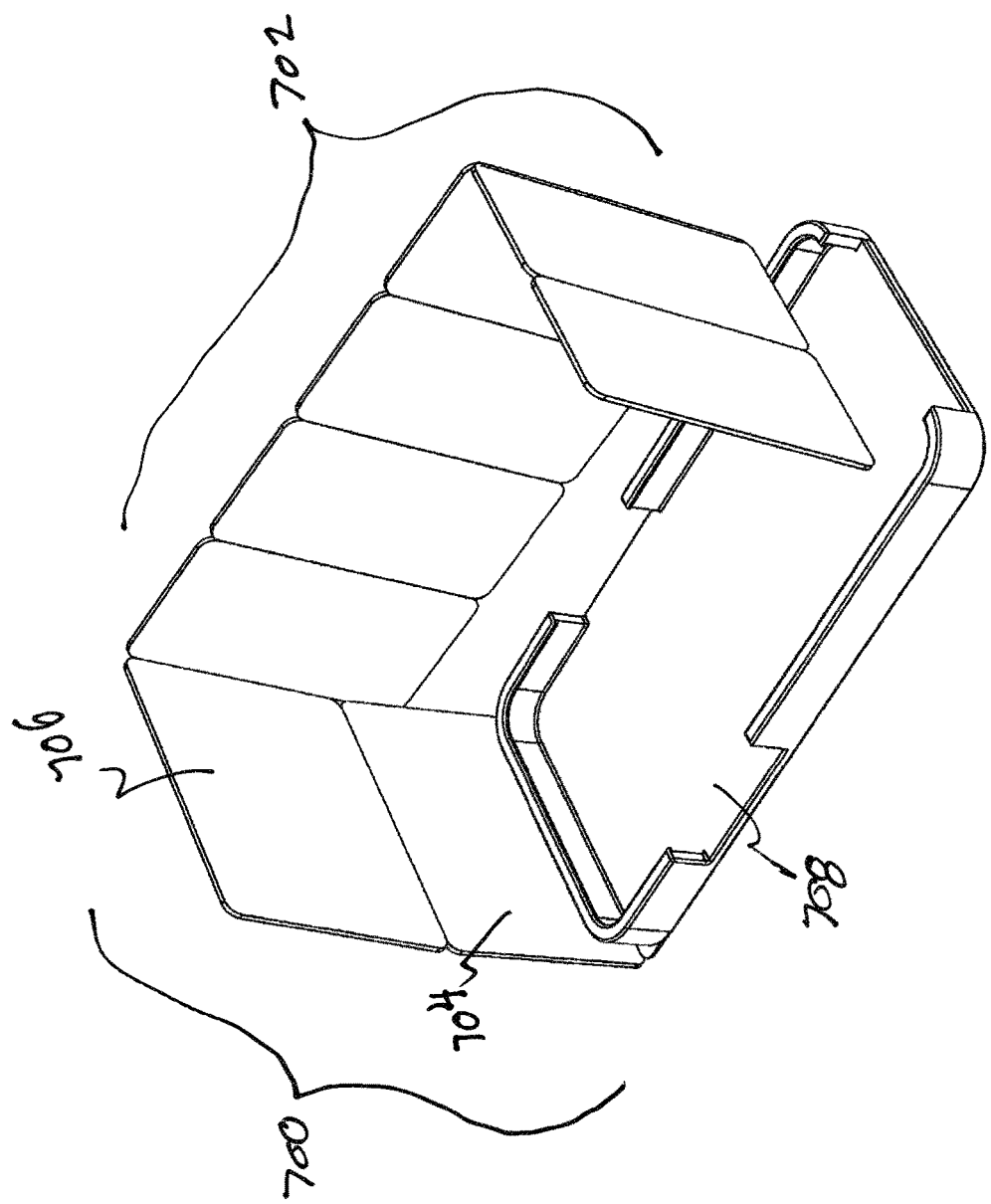
FIG. 21 is a further view of the embodiment of FIG. 20.

FIG. 20 is a perspective view of a further embodiment of the mobile phone case with shade 700. In this embodiment, the main hinged panels 704. 706, 710 are the same as previously described, but right side panel 12 includes additional hinged panels 702 that, when folded out completely, as shown in FIG. 21, act to shade the device screen when the screen is in a horizontal orientation. In embodiments, the side panel may be the left side panel instead of the right side panel.

Figure 22:
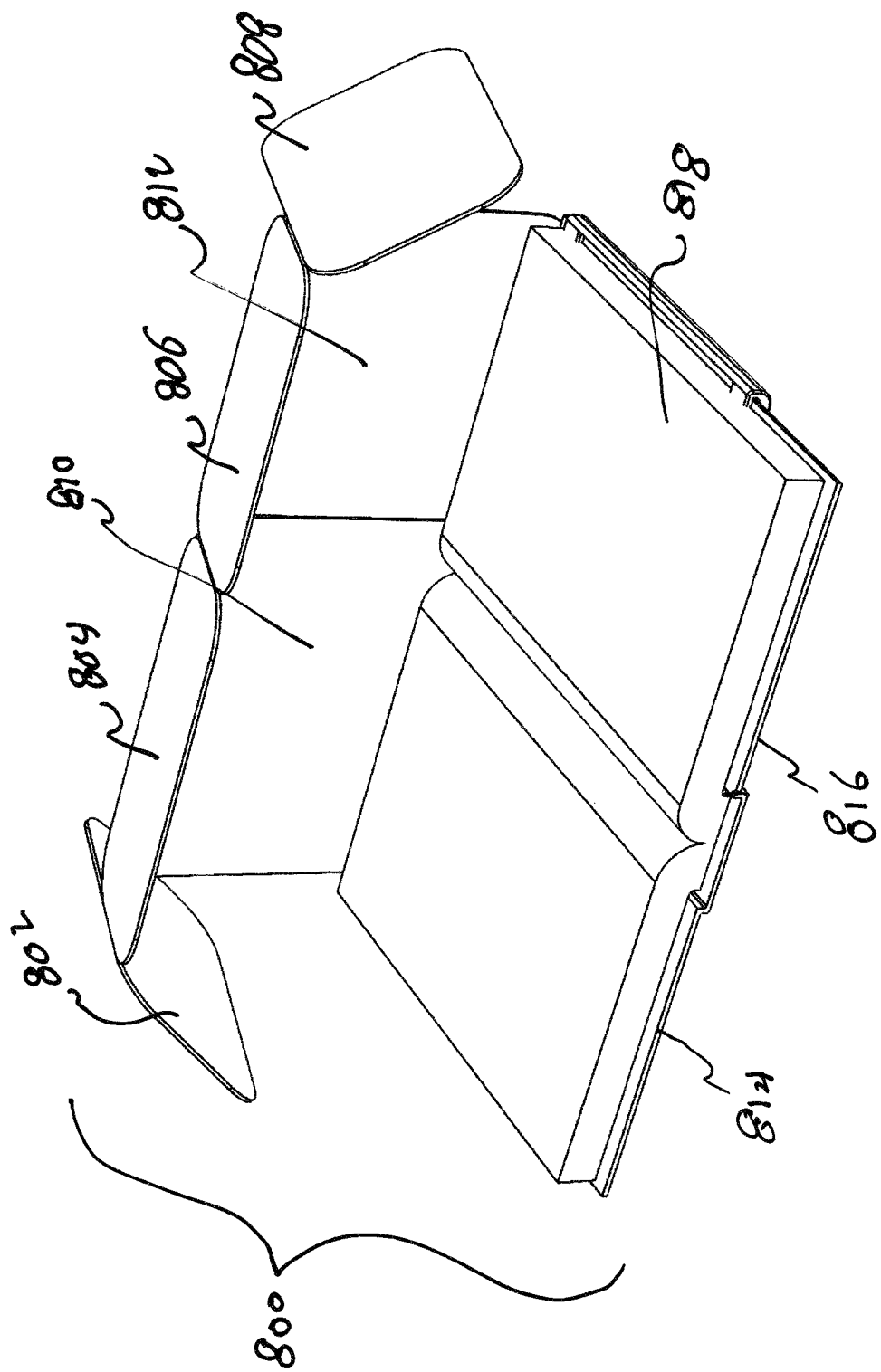
FIG. 22 shows a still further embodiment showing how a hinged shade can be used when reading a book 818.
Figure 23:
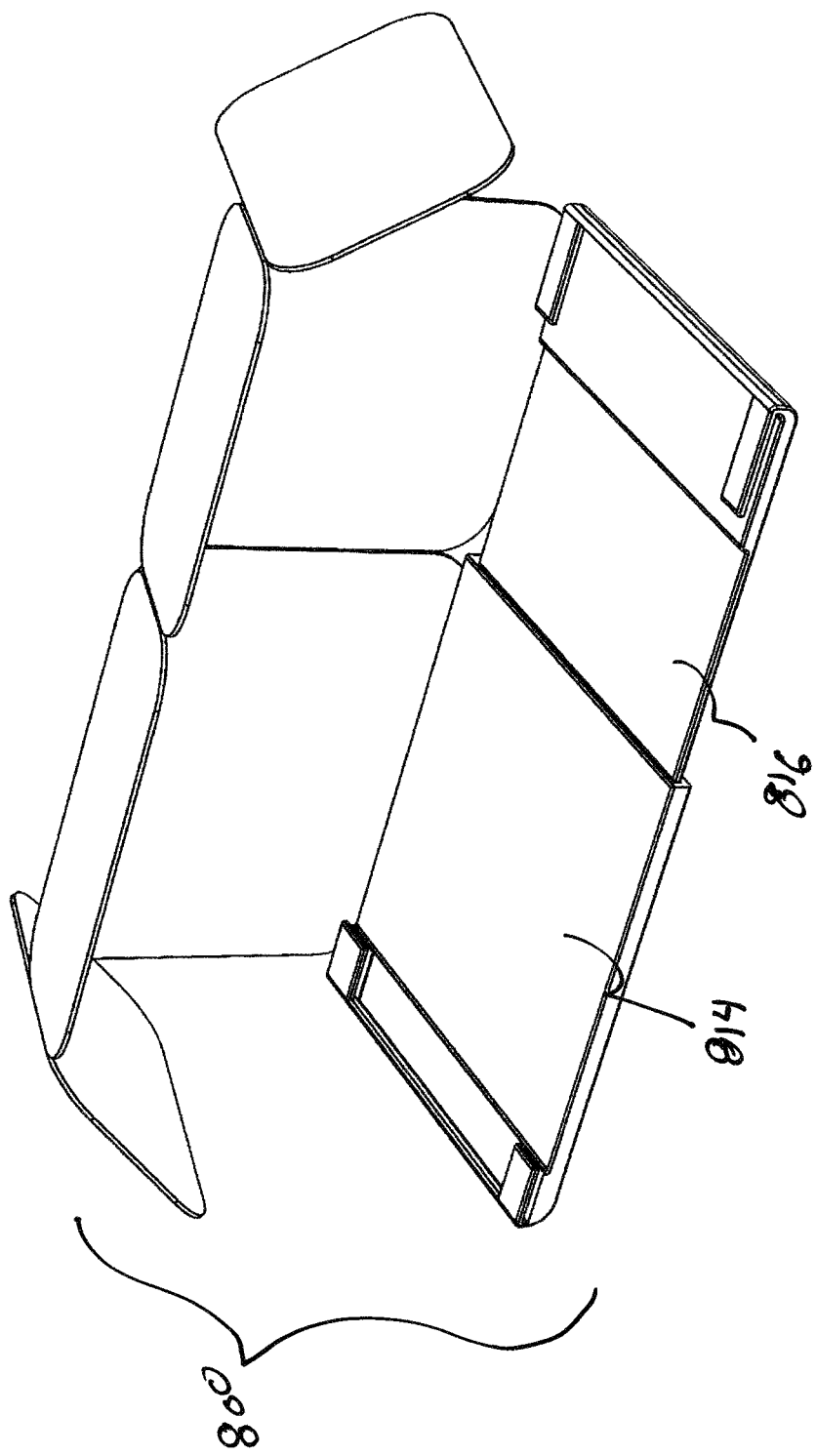
FIGS. 23-27 show how the panels fold into the eventual storage mode shown in FIG. 27.
Figure 24:
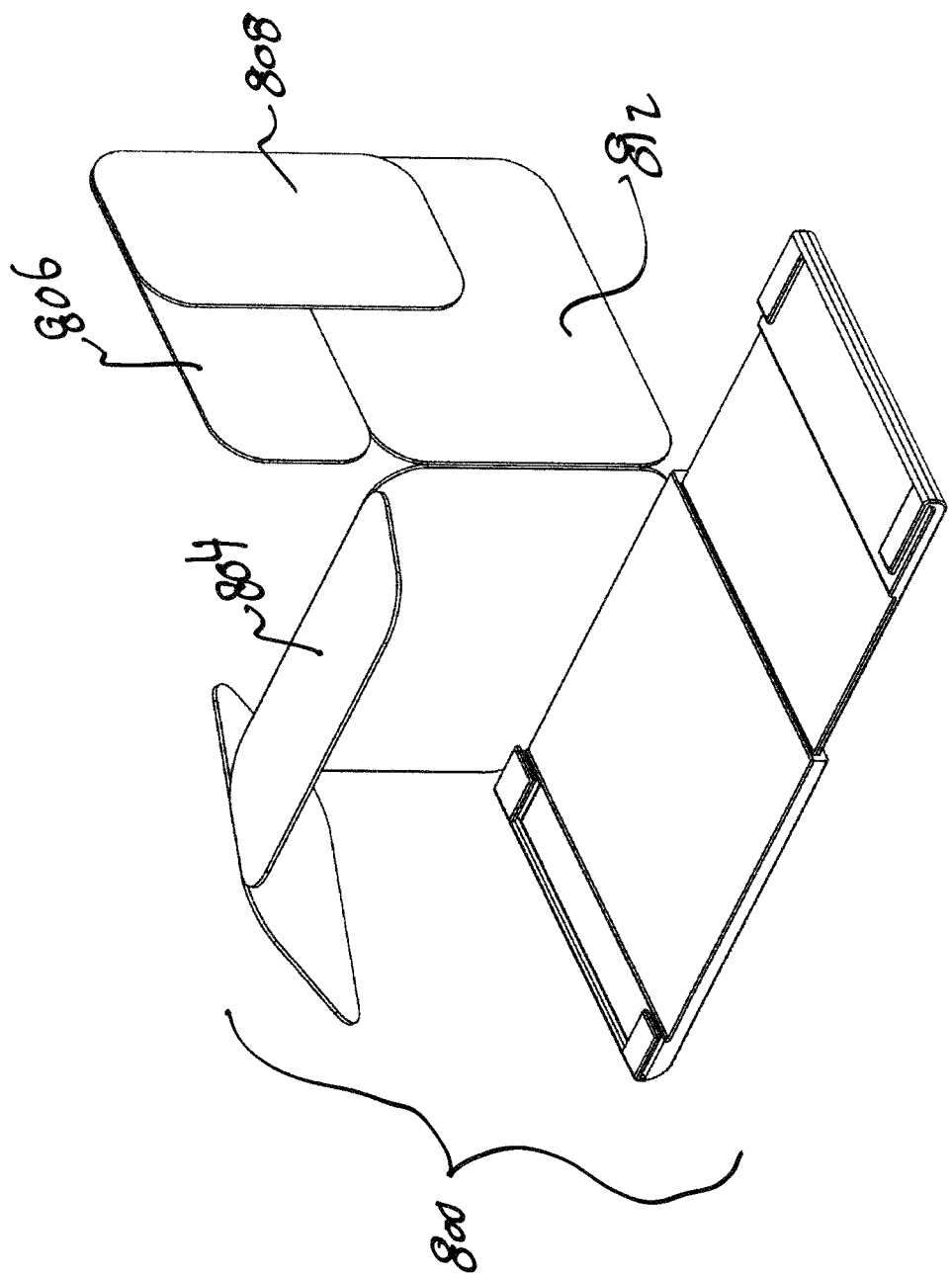
Figure 25:
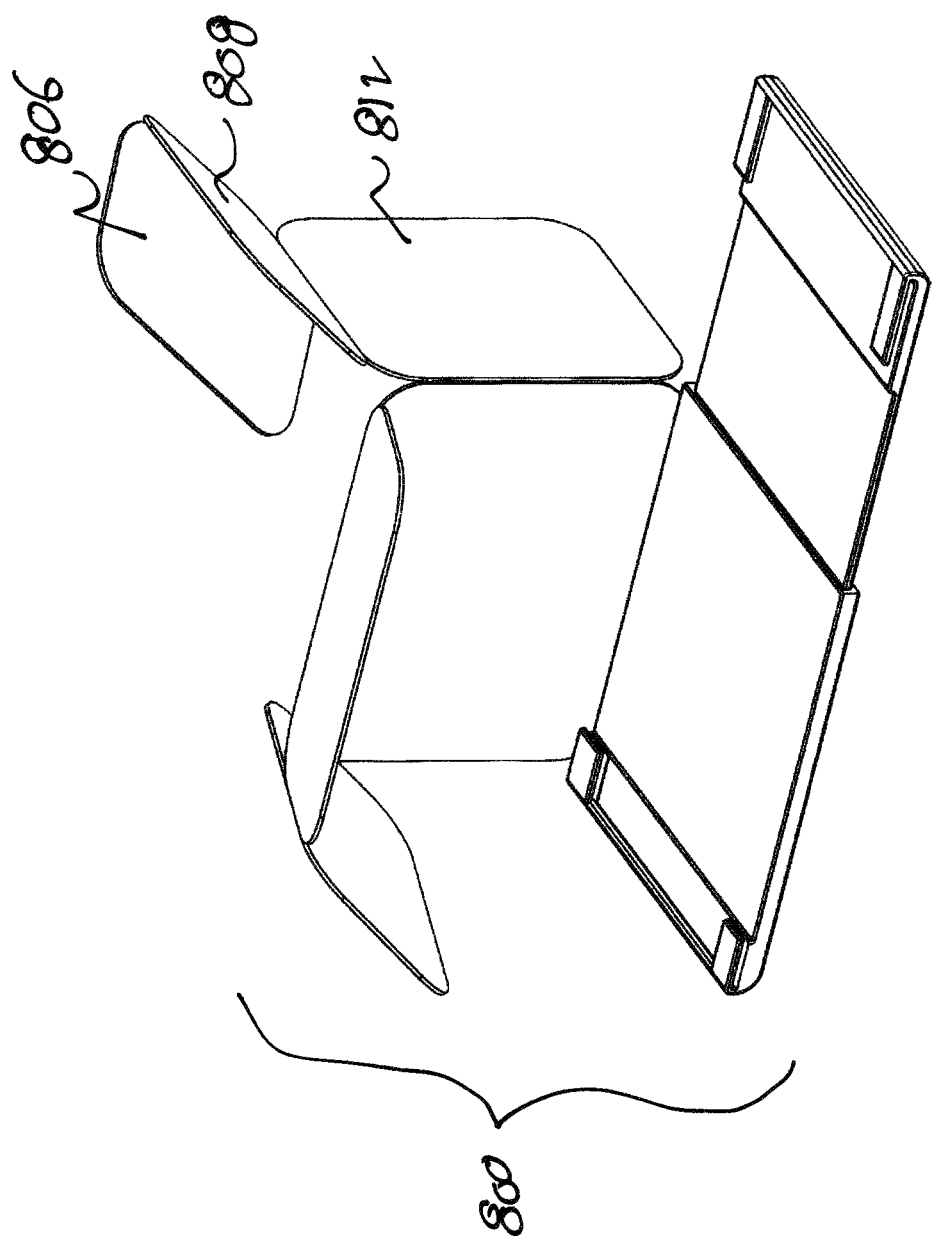
Figure 26:
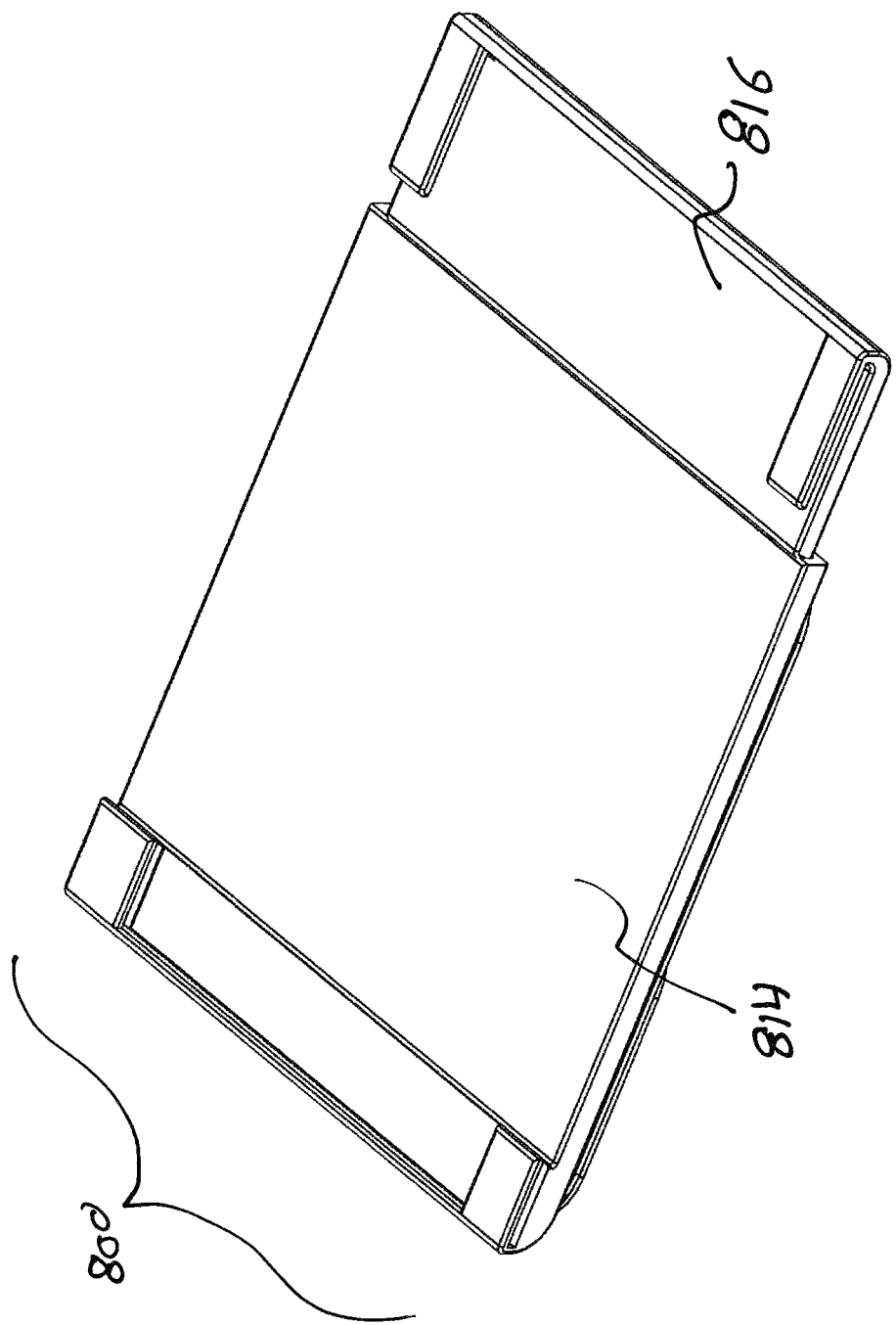
Figure 27:
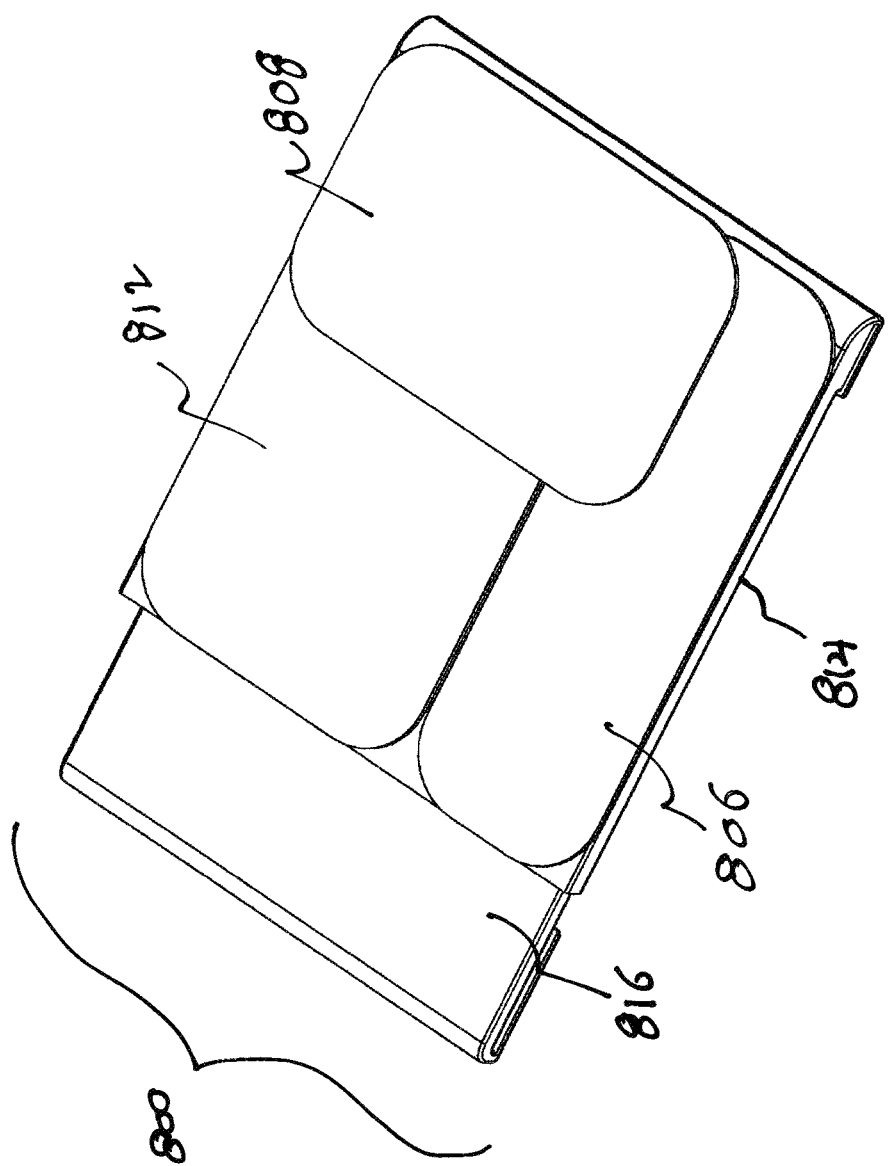

FIG. 22 is a still further embodiment 800 showing how a similar hinged shade can be used when reading a book 818. The base panels 814, 816 support a book 818. The base panels 814, 816 can slide closer together or further apart to accommodate various sizes of books. The shade panels 802. 804, 080, 810, 812 fold up and out to form an effective shade for the book 818. FIGS. 23 through 27 show how the panels fold into the eventual storage mode shown in FIG. 27.

Figure 28:
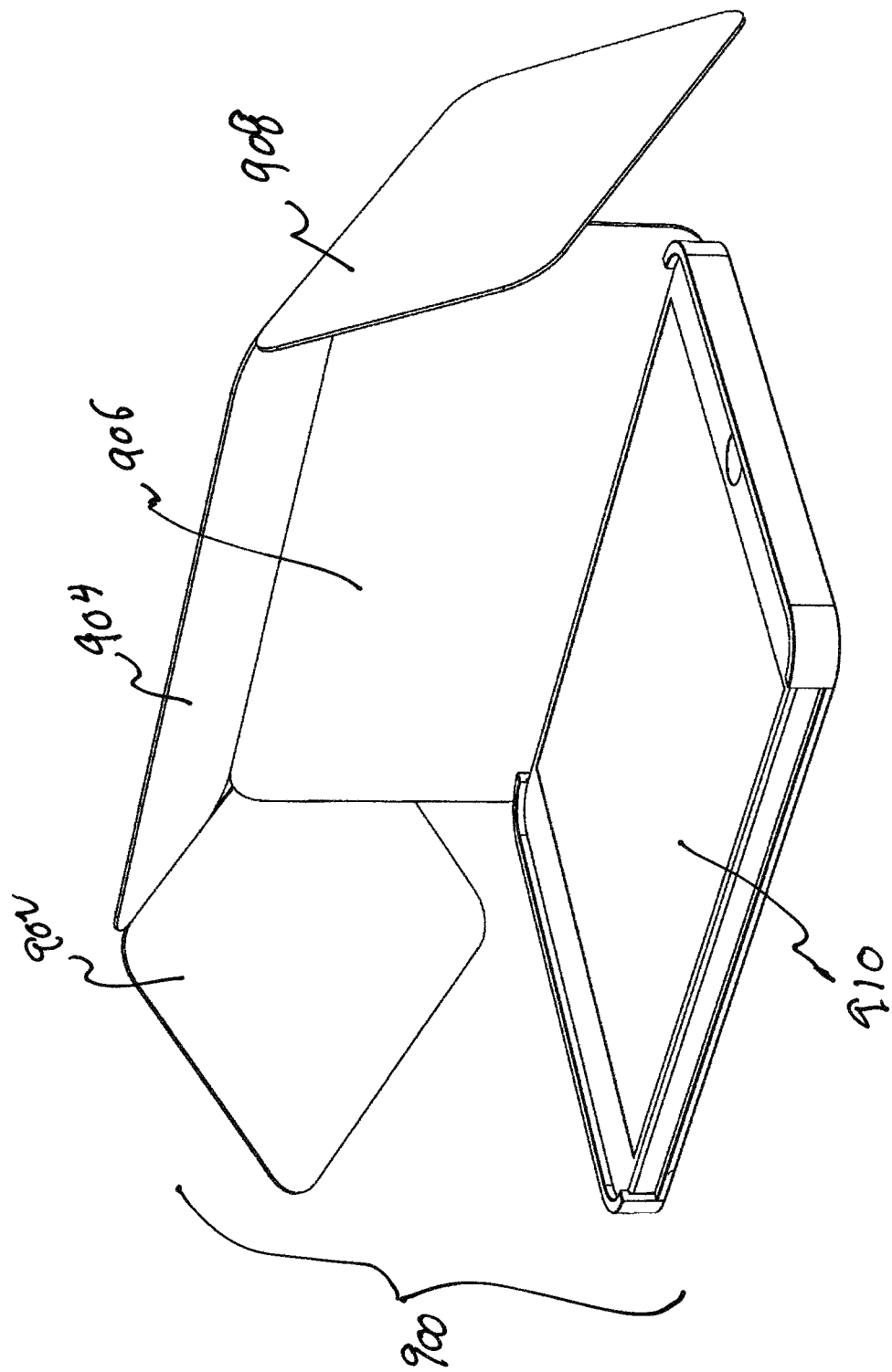
FIG. 28 is a perspective view showing a still further embodiment which is designed to be used with a tablet in a horizontal orientation.
Figure 29:
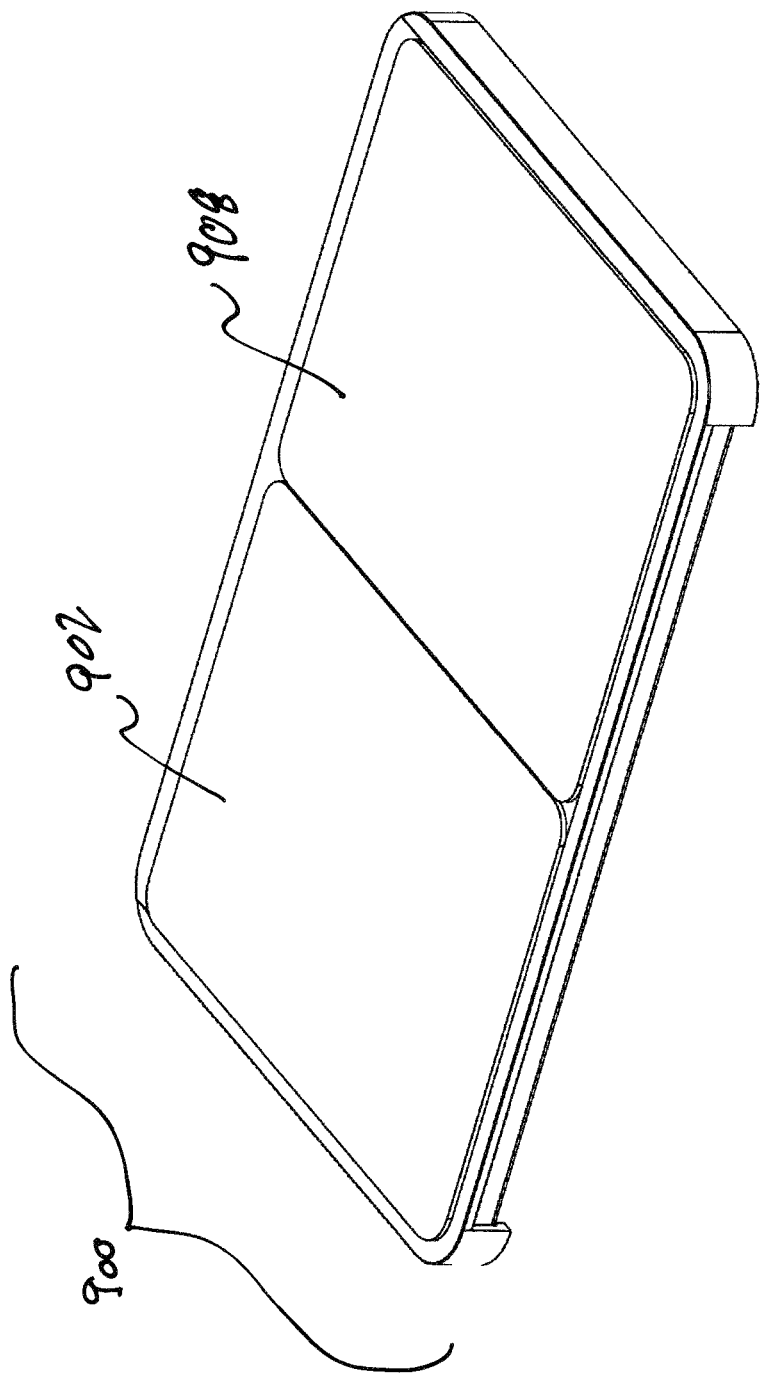
FIG. 29 shows the embodiment of FIG. 28 in the folded and stored position.

FIG. 28 is a perspective view showing a still further embodiment 900 which is designed to be used with an iPad or other tablet 910 in a horizontal orientation. In this case, the shade panel 906 folds up and out along the horizontal axis and hinged panels 902. 904, 908 fold into position to shade the tablet 910. FIG. 29 shows the embodiment 900 in the folded and stored position.

Figure 30:
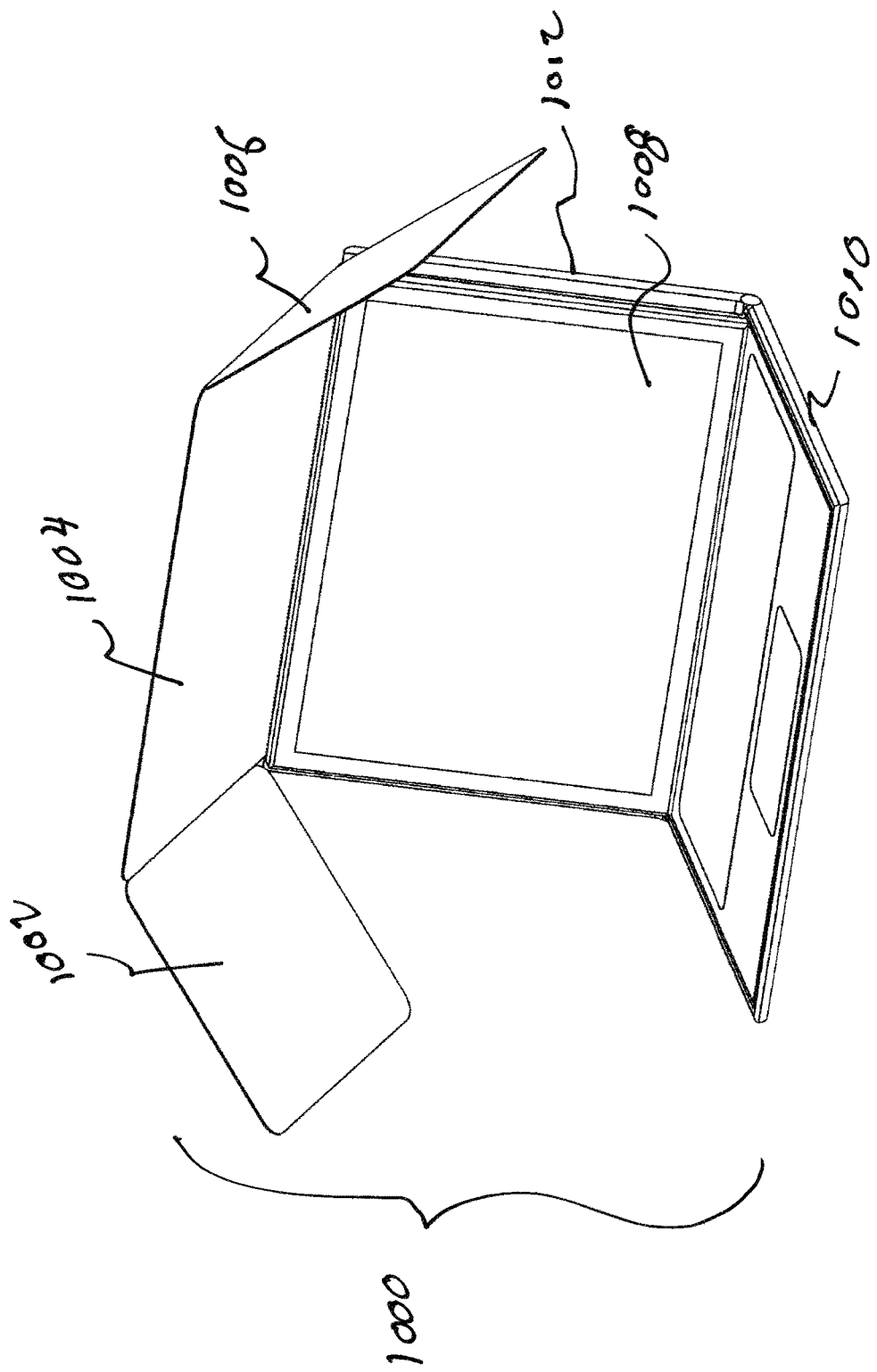
FIG. 30 shows an embodiment designed for a laptop computer.
Figure 31:
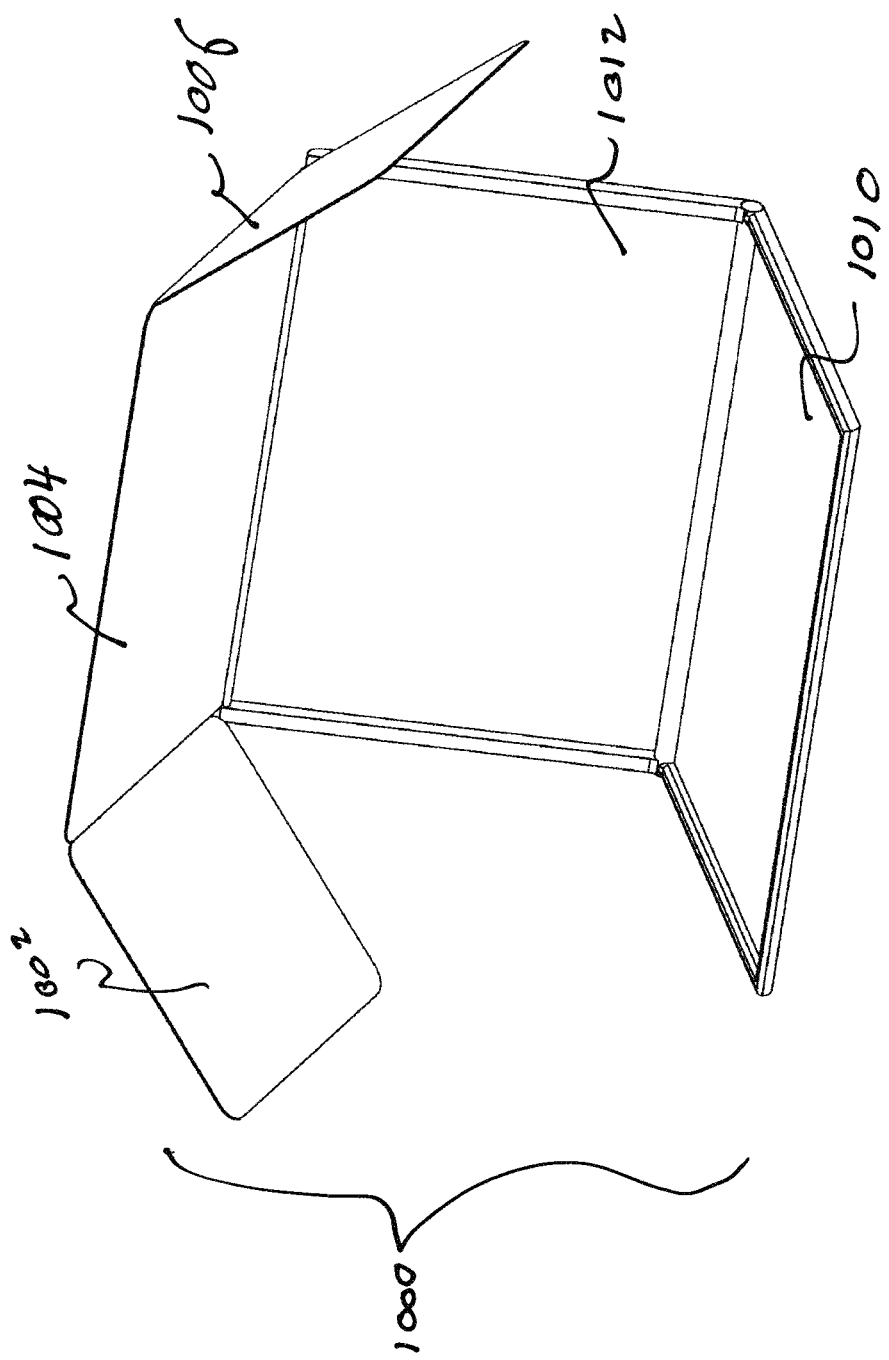
FIG. 31 shows the embodiment of FIG. 30 without the laptop computer in place.
Figure 32:
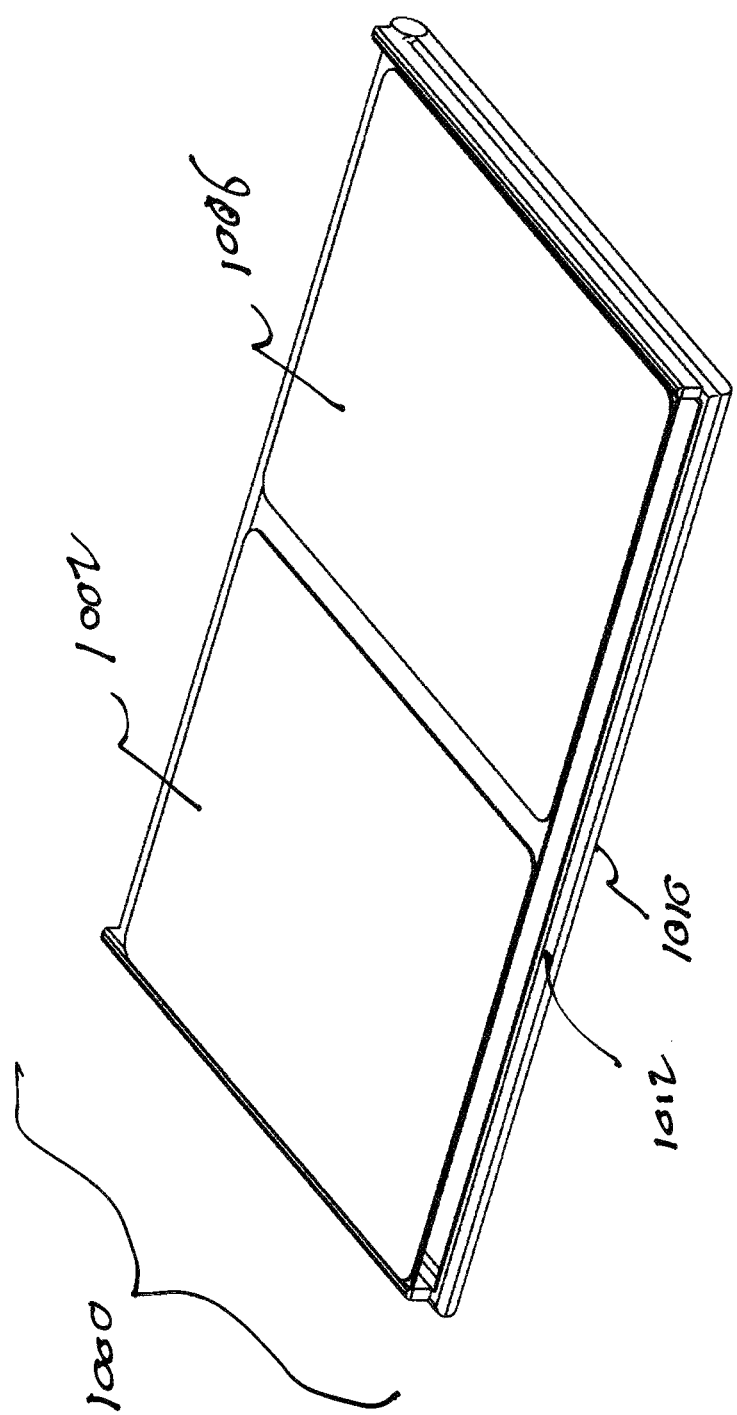
FIG. 32 shows the embodiment FIG. 30 in the completely folded and stored position.

FIG. 30 is a perspective view showing yet another embodiment 1000. This embodiment is designed for a laptop computer 1008 or notebook held in a base plate 1010 and screen support plate 1012. The hinged and folding panels 1002, 1004, 1006 work in a similar way as the panels in the embodiment 100. FIG. 31 shows the embodiment 1000 without the laptop computer in place. FIG. 32 shows the embodiment 1000 in the completely folded and stored position.

Figure 33:
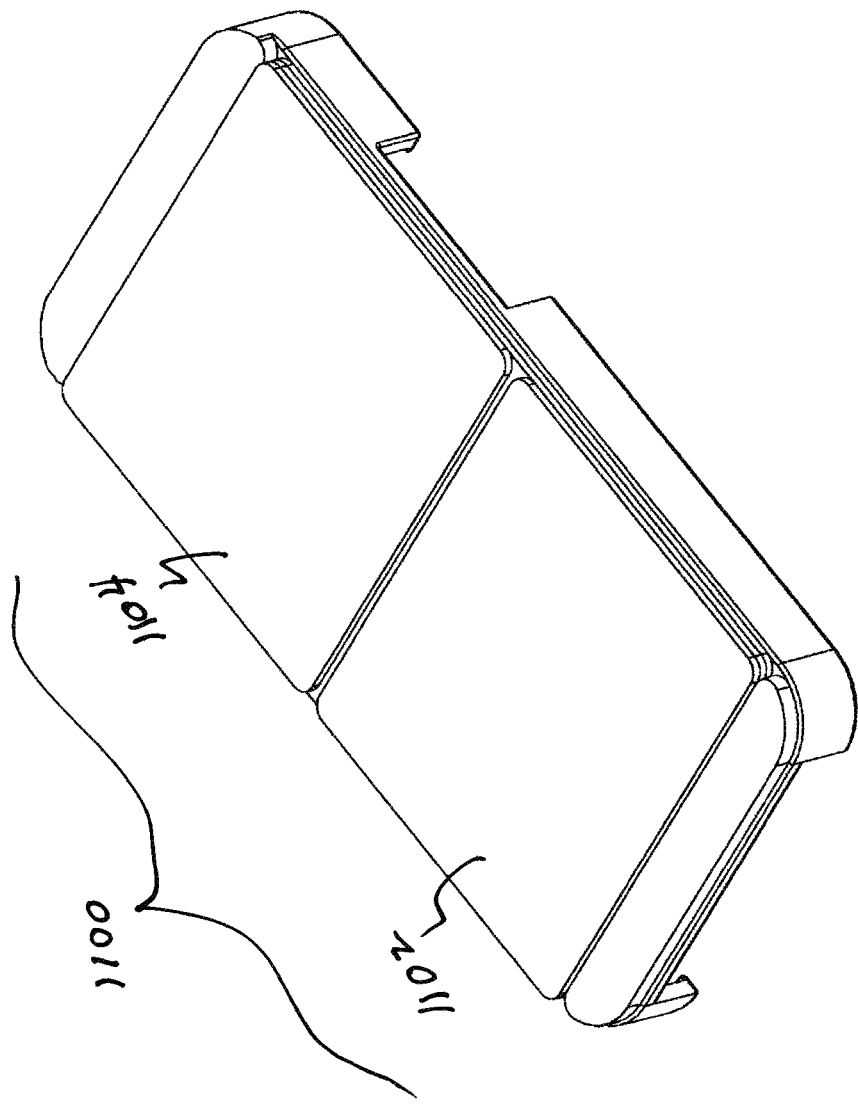
FIGS. 33-35 show an embodiment wherein a smart phone can be shaded in a horizontal orientation with the use of four panels.
Figure 34:
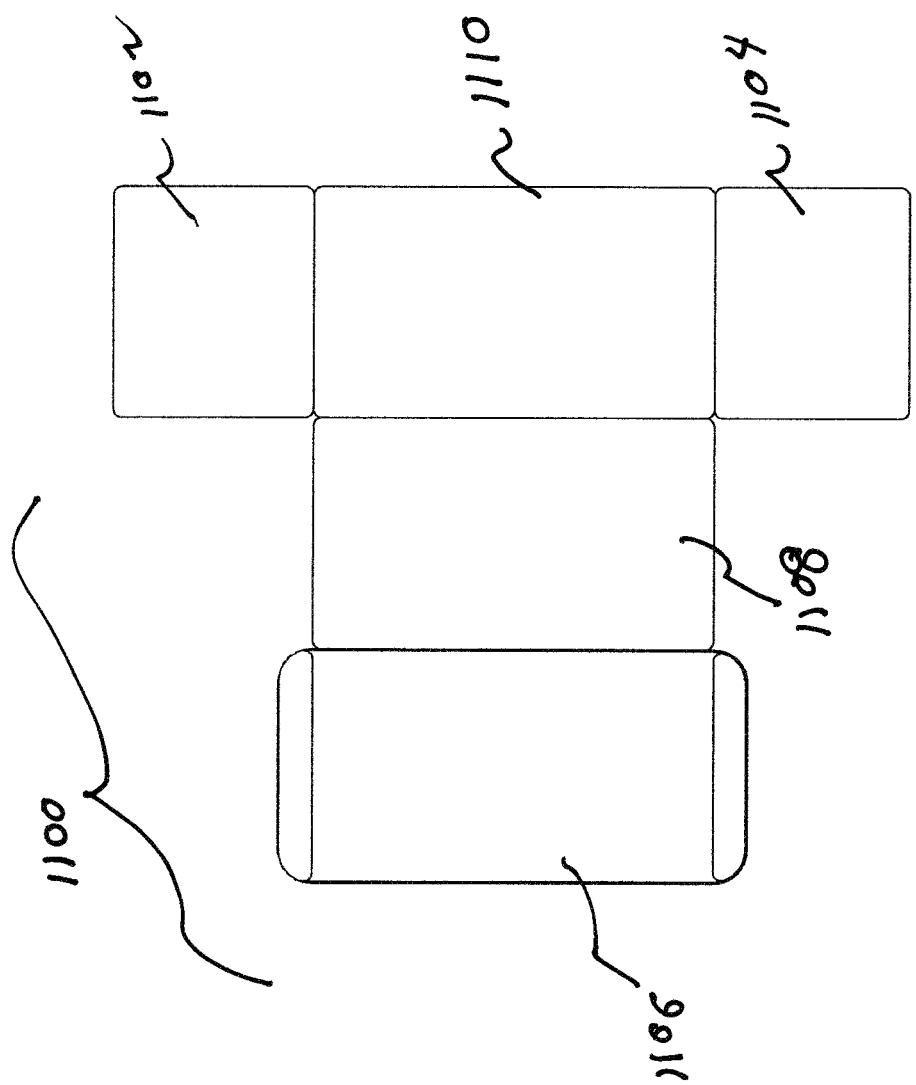
Figure 35:
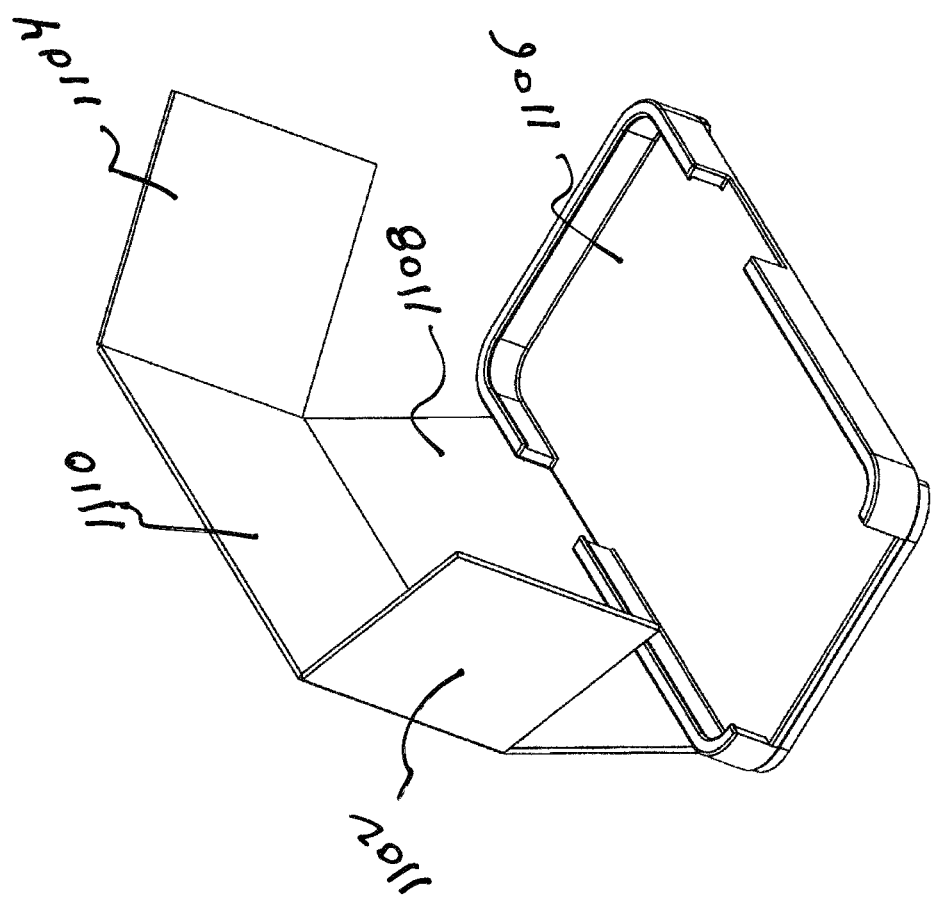

FIGS. 33 through 35 show embodiments of the case with shade 1100 where a device can be shaded in a horizontal orientation with the use of four panels 1102, 1104, 1106, 1108. FIG. 33 shows the panels in the storage position. FIG. 34 shows all panels laid out in a flat open position. FIG. 35 shows the panels in the use position.

While certain embodiments have been described in the present disclosure, such description are not intended to limit the scope of the disclosure to the particular forms set forth, but on the contrary, they are intended to cover such alternatives, modifications, and equivalents as may be included within the scope defined by the appended claims.

What is claimed is:

1. A mobile device case with shade comprising:
   an open-topped mobile device case that can removeably retain a mobile device;
   a shade member comprising:
      a plurality of panels each having integral mating hinge members hingedly connected to each other, wherein at least one of said plurality of panels is also hingedly connected to said mobile device case;
   said shade member being capable of being set in a deployed position to shade the display screen of the mobile device;
   wherein said panels are capable of being stored in a flat stacked condition on an underside of said mobile device case and also capable of being unfolded out and over the mobile device to act as a phone shade.

2. The mobile device case of claim 1, wherein the hinge members are tightly interconnected to each other, enabling said panels to remain set in their shade position by frictional force and capable of being repositioned by the user as needed.

3. The mobile device case of claim 1, further comprising a hinged easel-type kickstand member attached to a back side of said mobile device case to allow said mobile device case to be propped up during use.

4. The mobile device case of claim 1, further comprising:
   a hinged panel that allows said shade to clear a camera aperture on the mobile device.

5. The mobile device case of claim 1, further comprising:
   a spring member capable of returning said sheet member to a stored position when said sheet member is not being used as a shade.

6. The mobile device case of claim 1, wherein a side panel includes additional hinged panels, that, when folded out completely shade the mobile device screen when the screen is in a horizontal position.

7. The mobile device case of claim 1, wherein base panels are capable of forming a support for a book and wherein shade panels fold up and out to form an effective shade for the book.

8. The mobile device case of claim 1, wherein a mobile device comprises any of:
   a smartphone;
   a tablet computer;
   a laptop computer;
   a notebook computer;
   an MP3 player; and
   a body-borne computing device.

9. A method of shading a display of a mobile device from ambient light comprising:
   placing a mobile device in an open-topped mobile device case that is capable of hingedly connecting to a shade member, the shade member comprising:
      a plurality of panels each having integral mating hinge members hingedly connected to each other, wherein at least one of said plurality of panels is also hingedly connected to said mobile device case;
   connecting said shade member to said mobile device case; and
   setting said shade member in a deployed position to shade the display screen of the mobile device
   wherein said panels are capable of being stored in a flat stacked condition on an underside of said mobile device case and also capable of being unfolded out and over the mobile device to act as a phone shade.

* * * * *